(No Model.) 5 Sheets—Sheet 1.

J. P. NOYES.
DIFFERENTIAL GEAR FOR CABLE RAILWAYS.

No. 370,490. Patented Sept. 27, 1887.

Fig. 1.

Attest:
A. N. Jesbera
S. A. Stares

Inventor:
Joseph P. Noyes
By David A. Burr
Atty.

(No Model.) 5 Sheets—Sheet 3.

J. P. NOYES.
DIFFERENTIAL GEAR FOR CABLE RAILWAYS.

No. 370,490. Patented Sept. 27, 1887.

(No Model.) 5 Sheets—Sheet 4.

J. P. NOYES.
DIFFERENTIAL GEAR FOR CABLE RAILWAYS.

No. 370,490. Patented Sept. 27, 1887.

(No Model.)  5 Sheets—Sheet 5.

J. P. NOYES.
DIFFERENTIAL GEAR FOR CABLE RAILWAYS.

No. 370,490.  Patented Sept. 27, 1887.

Attest:
A. N. Jesbera
J. A. Stavers

Inventor:
Joseph P. Noyes
By David A. Burr
Atty.

N. PETERS, Photo-Lithographer, Washington, D. C.

UNITED STATES PATENT OFFICE.

JOSEPH P. NOYES, OF BINGHAMTON, NEW YORK, ASSIGNOR TO CHARLES B. FAIRCHILD AND ROSELLE H. MEAGLEY, BOTH OF SAME PLACE.

DIFFERENTIAL GEAR FOR CABLE RAILWAYS.

SPECIFICATION forming part of Letters Patent No. 370,490, dated September 27, 1887.

Application filed December 8, 1886. Serial No. 220,959. (No model.)

*To all whom it may concern:*

Be it known that I, JOSEPH P. NOYES, of Binghamton, in the county of Broome and State of New York, have invented certain new and useful Improvements in Differential Gearing for Driving the Cars upon Cable Railways; and I do hereby declare that the following is a full and exact description thereof, reference being had to the accompanying drawings, and to the letters of reference marked thereon, making a part of this specification, in which—

Similar letters and numerals indicate like parts in all of the figures.

The object of my invention is to permit a car which is propelled upon a railway by means of an endless chain or cable moving longitudinally parallel with the rails, and to which the car is connected or disconnected at pleasure, to be driven either forward or backward along the cable at varying rates of speed and independently of the constant rate of speed at which the propelling-cable travels, its movements being under the control of the brakeman or conductor upon the car. This object is accomplished by the interposition, in manner as hereinafter fully described, of differential gear between the main wheel or shaft, which is connected to or driven by the chain or cable, and the axles and carrying-wheels of the car. The differential gearing is brought into play, as required, by clutch devices, which are under the control of the conductor, and when the gearing is so brought into play the said carrying-wheels are thereby caused to perform a function as traction-wheels.

Figs. 1 to 5 of the accompanying drawings illustrate my invention as applied to a car in which the traction-cable is carried up from between two guide-pulleys over an intermediate superimposed traction-pulley, the said guide-pulleys acting at certain times also as traction-pulleys.

A represents therein the large traction or cable pulley, and B B the two smaller secondary guide and traction pulleys mounted below and to the front and rear of said main cable-pulley A.

C is the propelling-cable, which is carried from under the periphery of each of the secondary pulleys B B over the periphery of the central pulley, A. These three pulleys A B B are mounted in a common vertical plane in the middle of a suitable car-truck, D D, so as to be in line with the cable C, which is supported and carried in the customary manner upon friction-wheels in a subway formed centrally between the rails, and they are secured upon the inner ends of parallel shafts 10 10 and 11, which extend transversely from the middle of the truck D D out to one side thereof and rotate freely in suitable journal-boxes supported by its frame.

Figure 2:
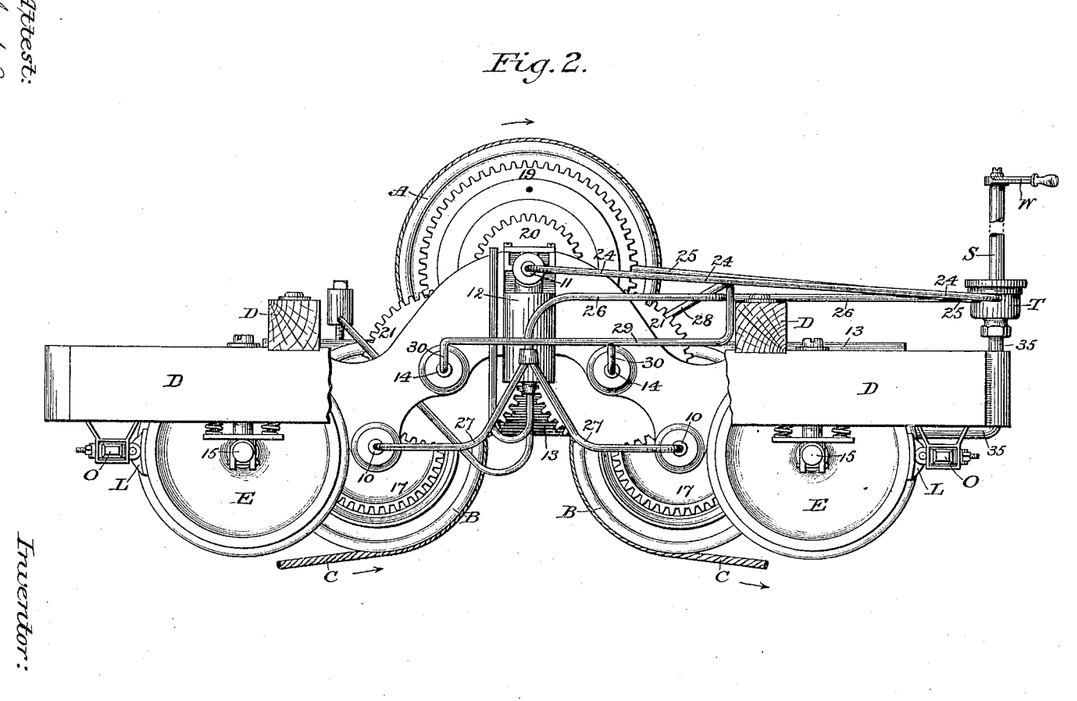
Fig. 2 is a side elevation of the same, with the frame partly broken away, illustrating the arrangement of air-tubes conducting air to the pneumatic clutches for the gearing.
Figure 5:
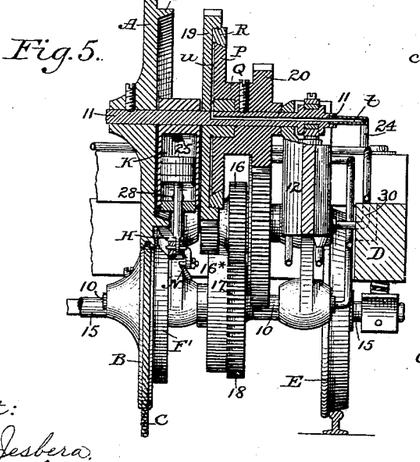
Fig. 5, a vertical cross-section, taken through the main pulley-shaft for the cable, in line $z\ z$ of Fig. 1.

Under the outer end of the upper shaft, 11, an air-pump, 12, is mounted to be worked in simple manner by an eccentric on the shaft engaging a cross-head on the upper end of the piston-rod of the pump, as shown in Figs. 2 and 5. This air-pump 12 communicates with a reservoir consisting of a cylindrical tank, 13, fitted and secured upon the truck D D on that side thereof opposite to the pump, or in any convenient position, and it is kept in operation to fill the tank by the rotation of the shaft 11 whenever the car is standing idly upon the track or is running at a greater or less speed than the cable.

An additional pump may be connected to either axle to come into use when the car is running at the same speed as the cable; but it is not believed to be necessary in practice.

Figures 3, 12:
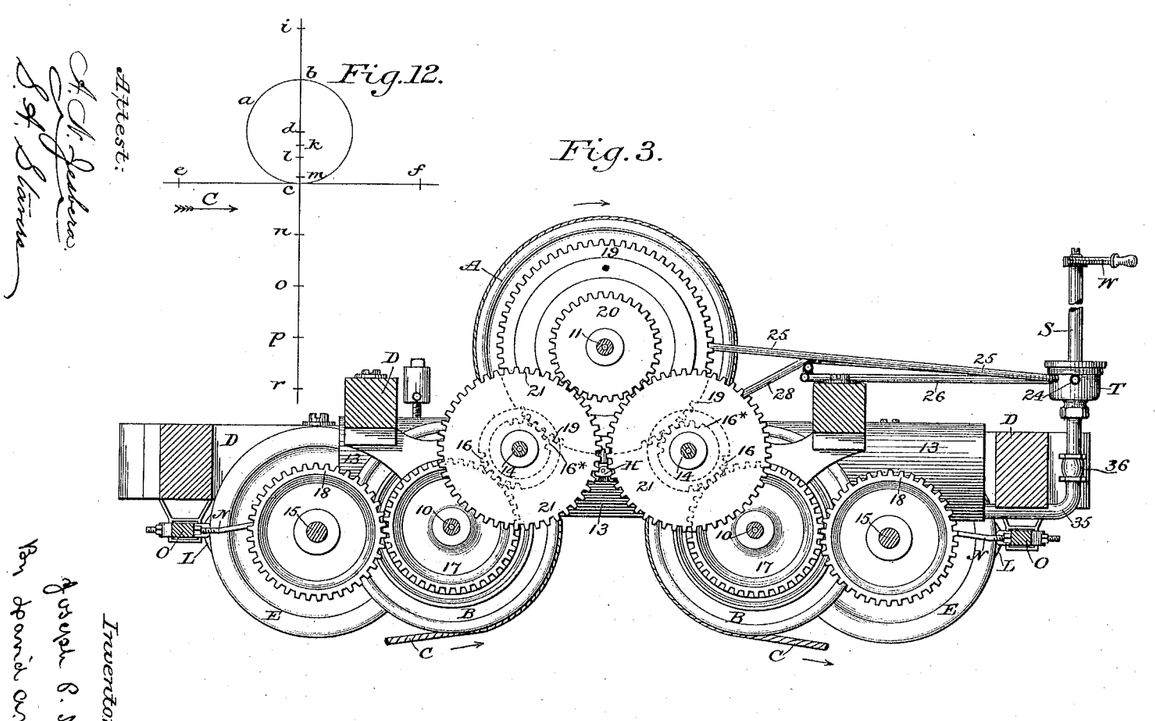
Fig. 3, a longitudinal section in line $x\ x$ of Fig. 1, illustrating the train of differential gear-wheels by which the movements of the truck are determined and varied.
Fig. 12 is a diagram illustrating the principles involved in the invention.

Two additional secondary shafts, 14 14, are mounted to rotate in bearings in the framework of the truck parallel with the pulley-shafts 10 10 and 11, each preferably about midway between the central shaft, 11, and one of the lower shafts 10 in a direct line drawn from the one to the other, as is shown in Fig. 3 of the drawings.

The shafts 10 10, carrying the secondary pulleys B B for the cable, are mounted at about the level of the axles 15 15, over and upon which the truck is supported in the customary manner. The truck-axles 15 15 are each fitted with corresponding cogged wheels, 18 18, which gear directly with spur-wheels 17 17, mounted to rotate loosely upon the shafts 10 10. (See Fig. 3.) These spur-wheels 17 17 gear in turn with corresponding pinions, 16 and 16, revolving with the intermediate secondary shafts, 14 14, and which each carry a small pinion, 16*, beside it, these two smaller pinions, 16* 16*, gearing both into a large cog-wheel, 19, mounted to revolve loosely upon the upper main shaft, 11. This whole train of cog-wheels by which the two axles are geared with each other and with the wheel 19 on the axial shaft of the main cable-pulley A, and with the wheels 17 17 on the axial shafts of the secondary pulleys B B, is left free to revolve idle and independently of said cable pulleys and shafts, and is kept in motion by the revolution of the cog-wheels whenever the car is in motion. The movement of this train of gear-wheels is made effective, however, either to reduce the speed of the car or to increase it beyond that of the cable; or to cause the car to run back in an opposite direction to that of the cable by means of a pinion, 20, made fast to the shaft 11 of the main cable-pulley A, gearing into larger counterpart spur-wheels, 21 21, turning loosely upon the secondary shafts 14 14. Suitable clutches, which may be selected from the many forms of such devices known to the art, are interposed between the pinion 20 and the idle-wheel 19, and also between each of the idle spur-wheels 21 and the pinion 16, revolving with the axial shaft of said spur-wheel.

When the cable C is in motion, the shafts 10 10 and 11 will be made to rotate by reason of the frictional grip of the cable upon the pulleys B B and A, made fast to said shafts. If, now, the cable be running in the direction indicated by the arrows in Figs. 2 and 3 and the spur-wheels 21 be locked to the pinions 16 16*, by means of the interposed clutches, the tension of the cable upon the pulley A will operate, through the train of geared wheels 20 21, 16*, 16, 17, and 18, to reverse the movement of the carrying-wheels E E, so that instead of moving the car forward they will cause it to move backward in a direction contrary to that of the cable at a speed which is determined by the relative diameters of all the wheels in the train then in action. The cable in this case is made to operate as a driving belt or chain, by which, through the intermediate gearing, the carrying-wheels are driven and made to serve as traction-wheels for the car.

In the drawings, the cable-wheel A, the train of gear-wheels 16*, 16, 17, 18, 20, and 21, and the carrying-wheels E E are represented as of such relative proportions as to cause the car to run at half speed backward when the cable-wheel is coupled to said train of gear-wheels, in manner as described.

If the spur-wheels 17 17 be locked by means of the interposed clutches directly to the axial shafts 10 10, carrying the cable wheels or pulleys B B, the friction of the cable C upon said pulleys, by imparting a rotary movement to the shafts 10 10, will produce a rotation of the spur-wheels 17, gearing into the counterpart spur-wheels 18 upon the truck-axles, and consequently govern the rotation of the carrying-wheels E E. If the diameter of each cable-wheel B be the same as that of the carrying-wheel E, to which it is geared, and the ratio between the cable-wheel and its gear-wheel is the same as that between the carrying-wheel and its gear-wheel 18, as shown in the drawings, the car will move at a speed one-half that of the cable; or by varying the ratio between the cable-wheel and its gear and that of the cog-wheel and its gear the car may be made to move at any desired speed not greater than and in the same direction as the cable.

If the large cog-wheel 19, which revolves loosely on the axle of the cable-pulley A, be locked by an interposed clutch to the pinion 20, and consequently to the axle 11, so as to revolve with said axle, the gearing of the large wheel 19 with the train of wheels 16*, 16, 17, and 18 will bring the resistance of the carrying-wheels E E, revolving with the gear-wheels 18, to bear upon said wheel 19. The point of bearing of each wheel E upon the track serves in this case as a fulcrum, from which, by reason of the different relative diameters of the wheel E and its gear and of the wheels in the train of gearing interposed between it and the pulley A, a leverage is brought to bear upon said pulley A, which will cause it to turn in a direction opposed to that in which the cable is running, and thereby cause the car to advance along the cable at a rate of speed determined by the difference in the ratios of the diameters of the gear-wheels, so that by varying and properly adjusting the relative dimensions of the wheel 19, pinions 16 16*, and spur-wheels 17 and 18 the car will, with the cable running at normal speed, be made to run forward along the cable at any desired increase of speed, since the pulley will take up the cable faster than the cable moves with it.

In the drawings the train of gearing is represented as of such relative proportions as that the effect of coupling the wheel 19 to the axle of the pulley A will be to run the car forward at a double speed.

The law controlling the motion of the car may be best explained by reference to the accompanying diagram, Fig. 12. Let the circle $a\,b\,c$ represent a car-wheel with its center at $d$, the line $e\,f$ a track on which it may roll, and the line $i\,r$ a prolongation of the vertical radius $d\,c$. Let the arrow C represent the direction of an applied force, such as a moving cable or chain, and the several letters along the line $i\,r$ be points where such force may be applied. Now, if the force be applied at $d$, (the center,) it is evident that the car would move in the same direction and at the same velocity as the cable, the reaction upon the track at $c$ having no other effect than to rotate the wheel; but if the force be applied at $b$ the wheel will rotate at only one-half the velocity, and therefore the car move at only half the speed, or in the ratio of $d\,c$ to $b\,c$, the force at $d$ being the sum of the pull at $b$ and the reaction at $c$. So, if the force is applied at any point, as $i$, the speed will be inversely and the reaction at $c$ directly in the ratio of $i\,c$ to $d\,c$. On the contrary, let us suppose the lines $k\,c$, $l\,c$, $m\,c$, respectively, to be equal to three-fourths, one-half, and one-tenth of $d\,c$. Then if the force be applied at $k$, the speed will be to that of the cable as four to three and the reaction at $c$ in the opposite direction to that in which it was before, and the force at $d$ would be the difference between the reaction at $c$ and the pull at $k$; or, in other words, the speed would be as $d\,c$ to $k\,c$ and the force at $d$ as $k\,c$ to $d\,c$, so at $l$ and $m$ the speed would be, respectively, twice and ten times that of the cable and the reactions in inverse ratio; but it is evident that if the force were applied at $c$ no motion could take place except by the slipping of the wheel, and that there must be a point which may be assumed to be between $m$ and $c$, where the force available at $d$ will no longer be sufficient to propel the car; but, still further, if the force be applied at $n$ the reaction at $c$ remains the same in direction as in the cases of $k\,l\,m$, but the reaction at $d$ is reversed, causing the car to move in the direction the reverse of the arrow, the speed being as $d\,c$ to $c\,n$, and so, respectively, as $d\,c$ to $c\,o$, $c\,p$, $c\,r$, &c.

Carrying out the principles set forth it will be seen that if in any combination of gearing the virtual velocity and direction of the perimeter on which the cable is acting becomes, when revolved, equivalent to that of an imaginary wheel passing through any of the points $i\,b\,k\,l\,m\,n\,o\,p\,r$, &c., the effect on the car is as if the cable were attached at that point. This also explains why gear in the reversed sense is required to drive the car slower than the cable, but is not required to drive the car backward, for it is when the point of attachment is changed from $k$ to $b$ that the reaction upon the track is reversed at $c$, while the same reaction is not reversed when the point of attachment is changed from $m$ to $n$, though the motion of the car is reversed.

The movement of the car at cable speed is obtained in the customary manner by simply arresting the idle movement of the cable-pulleys A B B. This is accomplished by means of brakes applied to peripheral flanges F F' (see Fig. 4) on said wheels.

Figure 4:
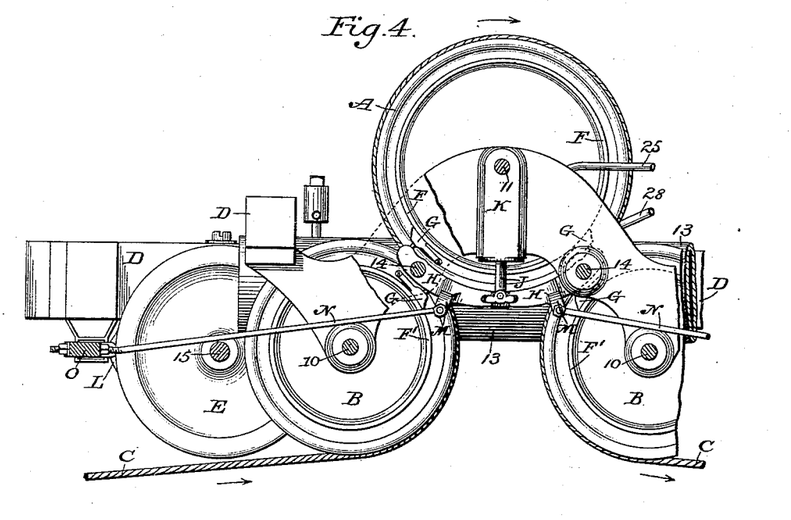
Fig. 4, a vertical sectional view, in line $y\ y$ of Fig. 1, of a portion of the truck, illustrating the construction and arrangement of its air-brake.

The brakes may consist of pairs of levers G G, (see Fig. 4,) pivoted each at one end to the frame-work of the truck between the cable-pulley A and one of the secondary cable-pulleys B. The free ends of the levers in each pair extend in opposite directions and terminate in suitable brake-shoes, which rest, respectively, against the peripheral flanges F F' of the pulleys. Operative levers H H are pivoted upon stud-pins or upon the ends of the shafts 14 14, which project between the pulley A and each wheel B, as shown in Fig. 4, and the longer inner ends of the two levers H H meet centrally under the axial shaft of the pulley A and are linked to the lower end of the rod J of a piston working in an air-cylinder, K, and forming an air-brake of simple construction. The outer end of each lever H is extended beyond its pivot sufficiently to bear against the brake-shoe resting against the flange of the main pulley, while a lug projecting from the lever on the opposite side of the pivot bears against the brake-shoe resting upon the flange F' of the secondary pulley B, so that when the longer arm of each lever H is depressed the brakes are applied to the pulleys and when lifted they are released therefrom. The upward movement of the piston in the cylinder K, while it serves to release the brakes from the cable-pulleys A B B, and consequently release the truck from the tension thereon of the moving cable C, is also made to operate to apply brakes to the wheels of the truck, so as to arrest its movement. These car-brakes L L are of the customary form, and the power of the piston in its upward movement is applied thereto to shut them down against the wheels by means of an arm, M, on each brake-lever H, connected by a coupling-rod, N, to the transverse bar O, carrying the brakes L L, as shown in Figs. 4 and 3, whereby the upward movement of the lever H draws the transverse bar O inward toward the wheel, and vice versa.

In connection with the air-brakes I prefer to use pneumatic clutches for locking, as desired, the several pulley-shafts to the train of wheels geared to the axles of the trucks, as hereinbefore described. These pneumatic clutches are constructed each of a circular disk or wide flange, P, encircling a collar, Q, (see, for example, Fig. 5,) which is fitted and secured upon the shaft 11 on which the idle-wheel 19 to be made fast revolves. The opposed faces of the clutch-disk and idle wheel or pulley are made true and exactly parallel, and are brought into close proximity. The periphery of the clutch disk or flange P is beveled off from its inner face at an acute angle and a ring, R, beveled to form an exact counterpart of the outer periphery of the disk P, and whose outer periphery is threaded, is secured into an annular seat formed in the face of the idle wheel or pulley 19, so as to draw and hold the disk P against the same. The marginal ring R revolves with the wheel 19 about the rim or periphery of the disk or flange P, and forms a dovetailed seat inclosing said rim. If, now, the disk P be forced away from the wheel 19, the beveled edge of the disk will be forced into frictional contact with the opposed beveled face of the annular confining-ring, and thereby cause an engagement of the two which, if the pressure is sufficient, will effectually lock the disk to the wheel. The requisite pressure is obtained by an admission of compressed air between the disk and wheel, which will operate to force them apart. The air is admitted between the two surfaces through an opening, $t$, pierced centrally in the shaft 11 longitudinally from its outer end to a point opposite the space between the disk and plate, into which it is made to communicate by a radial aperture, $u$. (See Fig. 5.)

Figure 6:
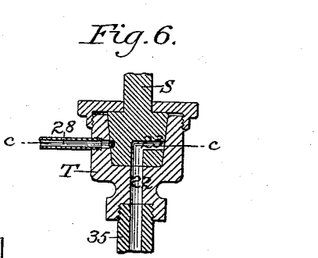
Fig. 6 is a vertical diametric section, on an enlarged scale, of the air-cock governing the brakes and clutches, in line $b\ b$ of Fig. 7, Fig. 7 being a transverse section in line $c\ c$ of Fig. 6.

The air-brakes and the several pneumatic clutches governing the idle-wheel 19 and idle-pinions 14 14 are controlled and operated by means of a cock, S, located upon the front end of the truck, so that its handle and lever may be within easy reach of a conductor or brakeman stationed on the front end of the car. This cock S (see Figs. 6 and 7) is formed to receive compressed air delivered thereto from the reservoir 13 through a connecting-pipe, 35, which screws into the bottom of the casing, in which the key of the cock works.

Figure 7:
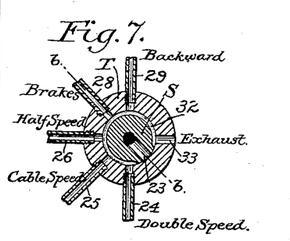

The feed-pipe 35 is fitted with a differential valve, 36, whereby the pressure of air supplied to the cock S is uniform and constant independent of any greater pressure in the tank 13. (See Fig. 3.) The key S is formed with a central recess, 22, extending from its lower end, where it communicates with the feed-pipe 35 to a transverse aperture, 23, extending radially from its upper end to the outer face of the key. Five apertures are pierced through the casing T, from the key-seat outward, (see Fig. 7,) in position to register accurately each with the mouth of the radial aperture 23 when the two are brought into line, and to these several apertures connecting-tubes are fitted to lead, respectively, the first, 24, to the center of the perforated end of the shaft 11, carrying the cable-pulley A, to which it is connected by a joint, permitting a free rotation of the shaft; the second, 25, to the upper end of the cylinder K of the air-brakes; the third, 26, by means of branch pipes 27 27 (see Fig. 2) to the center of the perforated ends of each of the two shafts 10 10, upon which the secondary cable-pulleys B B are mounted; the fourth, 28, to the lower end of the brake-cylinder K, and the fifth, 29, by suitable branch pipes, 30 30, to the perforated ends of the two shafts 14 14, carrying the pinions 16 16. A groove, 32, is cut in the periphery of the key S to partially encircle it in line with the supply-port or radial aperture 23 in the key and with the openings 24, 25, 26, 28, and 29 in the casing, its ends terminating on each side of the mouth of the supply port or aperture 23, as shown in Fig. 7. An exhaust-aperture, 33, is pierced through the wall of the casing, midway between the apertures 24 and 29, to register with the groove 32, so that the groove shall establish communication with said exhaust-aperture from each and all of the delivery-apertures 24, 25, 26, 28, and 29, which may not at the time be in direct connection with the supply-port 23.

The key S is provided with a handle or lever, W, whose position will serve to indicate with which of the delivery-pipes the air-supply pipe is connected through the cock and the consequent result. When the handle is turned into line with any one delivery-pipe to connect it with the feed-pipe 35, communication is thereby established between all the other delivery-pipes and the exhaust-opening 33 by means of the grooves 32 partly encircling the key S.

By turning the handle W into line with the pipe 29 compressed air will be admitted from the air-reservoir 13 through said pipe 29 and its branches 30 30 to the air-passages in the shafts 14 14. The air thus admitted between the spur-wheels 21, revolving loosely on said shafts, and the pinions 16 16*, fixed to the shafts, will operate to lock each wheel to its pinion, in manner as hereinbefore described. When the wheels 21 21 are thus locked to the pinions 16 16*, the tension of the cable upon the periphery of the large traction-pulley A, operating upon the comparatively small pinion 20, geared with the wheels 21 21, will be transmitted through the train 16*, 16, 17, and 18 to the car-wheels E E, and will reverse their movement in manner to produce a backward movement of the car at half speed, in a direction opposed to that in which the cable is running, in a manner equivalent to that resulting from the application of the force of the cable C at the point $o$ in the diagram, Fig. 12.

By turning the handle W into line with the pipe 28 the air will be allowed to exhaust from the pipe 29, thus releasing the pneumatic clutches between the gear-wheels 16 and 21, and will be admitted through the pipe 28 to the lower end of the air-brake cylinder K, and, operating to move the piston therein upward, will elevate the inner ends of the levers H H, and thereby release the brakes from the pulleys A B B, so that they will be free to run idly, and will simultaneously produce an application of the brakes L L to the truck-wheels E E, thereby arresting the movement of the car.

By turning the handle W into line with the pipe 26 air will be admitted through the pipe 26 and branch-pipes 27 27 (see Fig. 2) to the air-passages in the shafts 10 10, so as to set the pneumatic clutches, and thereby lock, in manner as described, the spur-wheels 17 17 to said shafts, so that their rotation, produced by the friction of the cable C in running over the secondary pulleys B B, will cause the wheels 17 17 to revolve, and thereby retard the revolution of the car-wheels E E, geared mediately to the shafts 10 10, so as to reduce the speed of the car to one-half that at which the cable is running, the result being equivalent to that produced by the application of the cable force, C, at the point $b$ in the diagram, Fig. 12.

By turning the handle W into line with the pipe 25 air will be admitted to the upper end of the air-brake cylinder K, and, forcing down the piston therein, will depress the lower inner ends of the levers H H, and thereby bring the brake-shoes G G to bear upon the flanges F F' of the cable-pulleys A B B, and by locking them will attach the cable to the car, so that the car will be carried by the cable at its full speed.

By turning the handle W of the cock S into line over the pipe 24, to open connection through it from the air-reservoir 13 to the air-passage in the shaft 11, the pneumatic clutch between the idle cog-wheel 19 and the disk P will be brought into action to lock the wheel to the disk, and by means thereof to the shaft 11 and to the pinion 20. By thus locking the wheel 19 to the disk P, so that the wheel is made to revolve with the axle 11 it will, by means of the train of gearing 16*, 16, 17, and 18, bring the resistance of the carrying-wheels into play to cause the wheel 19, and with it the cable-wheel A, to turn backward, or in a direction opposed to that in which the cable is running, so that it will take up the cable with such rapidity as to cause the car to run forward at twice the speed of the cable in a manner equivalent to that resulting from an application of the force of the cable C at the point $l$ in the diagram, Fig. 12. The movements of the car are thus regulated and controlled wholly by a simple movement of the cock handle or lever W in the hand of the conductor, whereby he may cause the car to stop, or start, or run backward, or to run forward, either at cable speed, half cable speed, or twice the cable speed, as occasion may require, the power applied to the car-wheels being increased when the speed of the car in running forward is reduced.

In the modification of my invention illustrated in the diagrams, Figs. 8 to 11 of the accompanying drawings, 40 represents a propelling chain or cable traveling along a cable railway and made to engage a sprocket-wheel, 41, secured to a shaft, 42, mounted upon the truck D of a railway-car. 43 43 are the car-axles, and E E the car-wheels.

Figure 8:
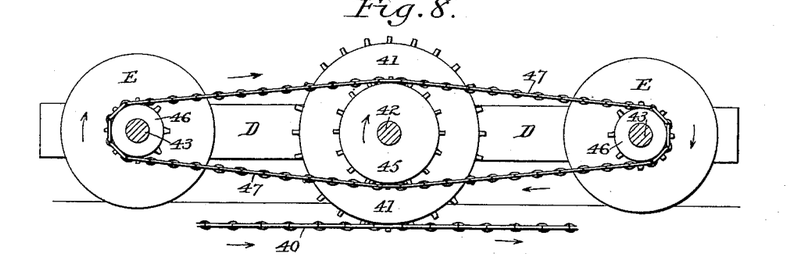
Figs. 8 to 11 are diagrams illustrating my invention as applied to a car upon a cable railway, in which the cable, in the form of a chain, engages a sprocket-wheel upon the car or car-truck.
Figure 9:
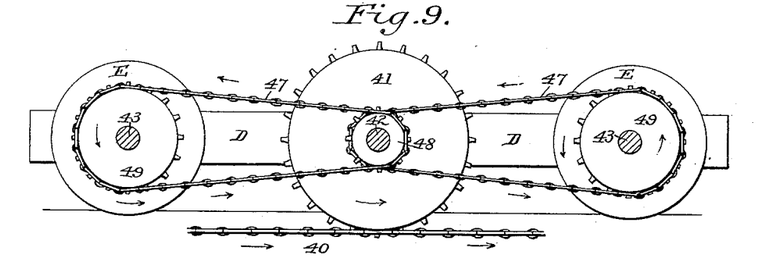
Figure 10:
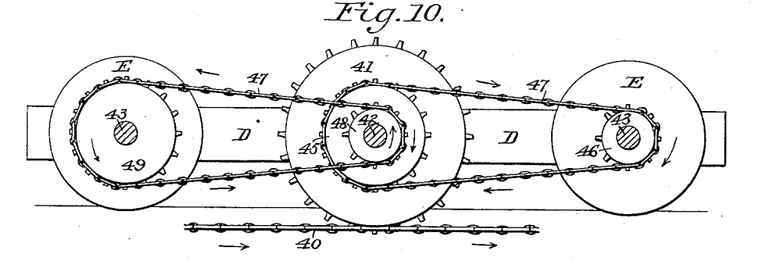

In Figs. 8 and 10, 45 is a gear-wheel mounted to revolve idly upon the axial shaft 42 of the wheel 41, which engages the propelling-cable. A clutch (not shown in the diagram) is interposed between said idle-wheel 45 and the shaft 42, whereby the two may be locked together. 46 is a second gear-wheel keyed to the car-axle, and 47 a chain by which the two wheels 45 and 46 are geared together.

If the ratio of diameters of the gear-wheels 45 and 41 be larger than that between the gear-wheel 46 and carrying-wheels E E, the engagement of the moving chain or cable 40 with the main-cable wheel 41, will, when the wheel 45 is clutched to the shaft 42, so as to turn with the main wheel 41, cause the car to move forward faster than the propelling-cable in inverse proportion as the ratio of difference in diameter between the cable-wheel 41 and its gear-wheel 45 is greater than that between the carrying-wheel E and its gear-wheel 46, as is illustrated by reference to the points $k$, $l$, and $m$, in Fig. 12. If, on the other hand, as shown in Fig. 8, the gear-wheel carried by the cable-wheel 41, be made in smaller ratio (seen at 48, Fig. 9) than the gear-wheel secured to the axle, (see 49, Fig. 9,) then the car will move backward over the propelling-chain in inverse proportion as the ratio between the cable-wheel and its gear-wheel differs from that between the carrying-wheel and its gear-wheel, as is illustrated by reference to the points $n$, $o$, $p$, and $r$, in Fig. 12.

Where great variation of speed is not required, and where there are no heavy grades to overcome, so that the traction of one pair of wheels will suffice to drive the car, the arrangement of differential gear shown in Fig. 10 may be employed, in which the axial shaft 42 of the cable-wheel 41 is fitted with two idle gear-wheels of different sizes—viz., a small one, 48, and a large one, 45, each of which may be made fast to the shaft by a suitable clutch when the other is left free. The small wheel 48 is geared by a chain, 47, to a larger wheel, 49, secured to one of the axles 43, and the large wheel 45 is similarly geared to a smaller wheel, 46, on the other axle, so that by locking the larger wheel, 45, to the driving-shaft 42 the car will be made to move forward faster than the propelling-chain 40, or by locking the small wheel 48 to the driving-shaft the car will be made to move backward. In any case, the main cable-wheel 41 is made to serve as a grip, so as to carry the car forward at the same speed as the propelling chain or cable 40, by simply locking or breaking the wheel to prevent it from revolving.

Figure 11:
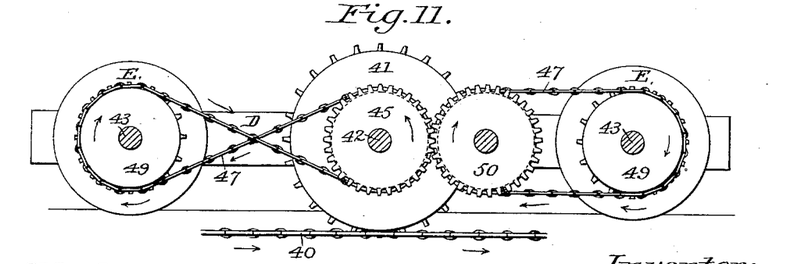

To cause the car to move forward at a less speed than the cable, the chain 47, by which the gear-wheels on the main driving-shaft 42 and axle are connected, must be crossed, as illustrated on the left hand in Fig. 11, or otherwise an idle-wheel, 50, to be driven by the gear-wheel on the shaft 42, must be interposed between said gear-wheel, and that on the car-axle, and the two connected by a suitable gearing, as illustrated at the right hand in said Fig. 11.

Figure 1:
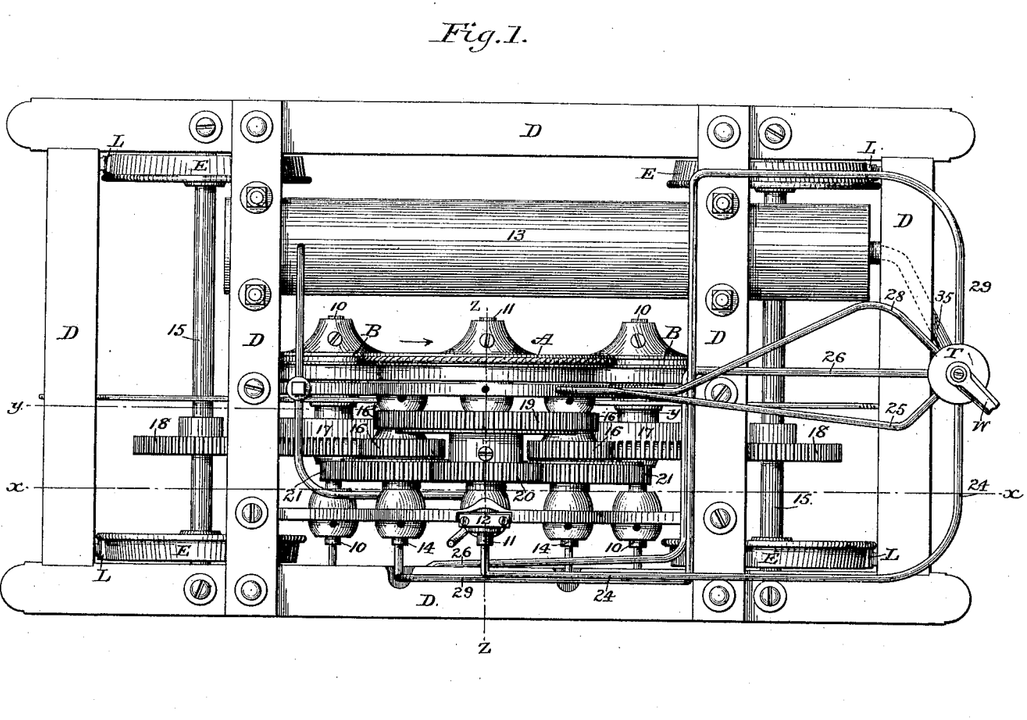
Figure 1 is a plan view of a car-truck for a cable railway to be driven by a cable engaging one or more drums or pulleys on the car or car-truck, and which is fitted with a train of differential gear and with pneumatic brakes and clutches in accordance with my invention.

By the use of a chain, 40, and sprocket-wheel 41, as shown in Figs. 8 to 11, instead of a rope, C, passing over one or more pulleys, A B B, as shown in Figs. 1 to 3, the car may be readily detached from the cable, and the chain can be made of any needed strength and weight without bringing any weight or strain therefrom to bear upon the car-truck and its gear.

My invention permits the use of a very slow-running cable with an economy of power, as upon easy grades the car may be run ten times as fast as the cable, if desired.

It is evident that very many combinations of the differential gear, or variations in the relative diameters thereof, may be made upon the same car to obtain a great variety of movements, and that any form of gearing for connecting the wheels may be employed with like effect.

I claim as my invention—

1. The combination, with a cable-railway car and its carrying-wheels and the traction chain or cable for its propulsion, of a wheel mounted upon the car to be engaged and driven by said cable, and a differential gear, substantially as described, connecting said cable-wheel with one or more of the carrying-wheels, substantially in the manner and for the purpose herein set forth.

2. The combination, with a cable-railway car and its carrying-wheels and the traction chain or cable for its propulsion, of a wheel mounted upon the car to be engaged and driven by said cable, a differential gear, substantially as described, connecting said cable-wheel with one or more of the carrying-wheels, and a clutch interposed between the cable-wheel and gear, substantially in the manner and for the purpose herein set forth.

3. The combination, with a rotating shaft on a cable-railway car driven by the engagement of the traction-cable with a wheel keyed on the shaft, of an idle-wheel revolving loosely on said shaft, an interposed clutch, a driving-wheel secured to an axle of the car, and a train of differential gearing interposed between the idle-wheel and said driving-wheel, substantially in the manner and for the purpose herein set forth.

4. The combination, with a toothed wheel upon the axle of a cable-railway car, the carrying-wheels secured to said axle, and a pulley keyed to a separate rotating shaft over which the propelling-cable is carried, of a train of differential wheels geared substantially as described and interposed between the axle and the pulley-shaft, and a clutch for coupling and uncoupling the gear-wheels to the pulley-shaft, substantially in the manner and for the purpose herein set forth.

5. The combination, with the two axles of the truck of a cable-railway car, a toothed wheel upon each axle, carrying-wheels secured to said axles, a pulley keyed upon an independent shaft, over which the traction-cable of the road is carried, and an idle-wheel upon said shaft, of a train of differential gearing connecting the toothed wheel upon each axle with the idle-wheel upon the pulley-shaft and a clutch device, whereby the idle-wheel is made fast to said pulley-shaft, substantially in the manner and for the purpose herein set forth.

6. The combination, with the truck of a cable-railway car and its two axles, carrying-wheels secured to said axles, and a main central pulley and two secondary pulleys mounted upon the truck and over and between which the traction-cable of the road is carried, of an idle-wheel upon the shaft of each secondary pulley, counterpart toothed wheels secured to each of the axles and gearing, respectively, with said idle-wheels, an idle-wheel of larger diameter upon the driving-pulley shaft, small pinions interposed between the one large and two smaller idle-wheels, and clutch devices interposed between the two smaller idle-wheels and the shafts upon which they revolve, all substantially in the manner and for the purpose herein set forth.

7. The combination, with the truck of a cable-railway car, an axial shaft mounted upon said truck, a wheel keyed to said shaft, over which the traction-cable of the railway is carried, a pinion secured to and a toothed wheel revolving idly upon said shaft, toothed wheels upon the two axles of the car, spur-wheels geared to said toothed wheels, and pinions interposed between said spur-wheels and the idle-wheel on the pulley-shaft, of two idle-wheels revolving loosely upon the axial shafts of said pinions, both meshing with the pinion secured to the pulley-shaft, and clutch devices for locking these idle-wheels to the pinions, all substantially in the manner and for the purpose herein set forth.

8. The combination, in a cable-railway car, with the wheel and shaft driven by engagement with the cable, of an air-pump connected with said shaft to be driven by its rotation, substantially in the manner and for the purpose herein set forth.

9. The combination, with a cable-railway car, a traction chain or cable for its propulsion, a pulley and pulley-shaft mounted upon said car to be engaged and driven by said cable, a train of differential gear connecting said shaft with one or more of the axles of the car, and an idle-wheel in said train, of a pneumatic clutch constructed substantially as described, interposed between said idle-wheel and its shaft, an air-tank carried upon the car, a pipe connecting said pneumatic clutch with the tank, and a multiple-way cock interposed in said pipe between the tank and clutch to govern the operation of the clutch, substantially in the manner and for the purpose herein set forth.

10. The combination, in a cable-railway car with the pulley and pulley-shaft driven by engagement with the cable, an air-pump operated by the rotation of said shaft, and an air-tank connected with the pump, of an air-cylinder, a piston working within said cylinder, brake-levers actuated by the movement of said piston, brake-shoes bearing upon the cable-pulleys and upon the traction-wheels of the car and actuated by said brake-levers, air-pipes connecting the opposite sides of the piston with the tank, and a cock interposed between the tank and said pipe to control the supply of air to the piston, all substantially in the manner and for the purpose herein set forth.

In testimony whereof I have signed my name to this specification in the presence of two subscribing witnesses.

JOSEPH P. NOYES.

Witnesses:
A. L. PINE,
NERI PINE.